United States Patent [19]

Jones

[11] 4,262,337
[45] Apr. 14, 1981

[54] PORTABLE CALCULATOR INCORPORATING AN ANTI-THEFT FEATURE

[75] Inventor: Trevor O. Jones, Birmingham, Mich.

[73] Assignee: General Motors Corporation, Detroit, Mich.

[21] Appl. No.: 502,278

[22] Filed: Sep. 3, 1974

[51] Int. Cl.³ .............................................. G06F 7/00
[52] U.S. Cl. ................................. 364/709; 340/365 R; 364/715
[58] Field of Search .................... 235/156, 61.7 B; 340/172.5, 147 R, 149 R, 146.1 R, 147 MD, 324 R, 365 R; 317/134; 364/709, 715, 700; 361/1

[56] References Cited

U.S. PATENT DOCUMENTS

| | | | |
|---|---|---|---|
| 3,609,697 | 9/1971 | Blevins et al. | 340/146.1 |
| 3,702,987 | 11/1972 | Twyford | 340/172.5 |
| 3,806,882 | 4/1974 | Clarke | 340/172.5 |

FOREIGN PATENT DOCUMENTS 1574552  9/1971  Fed. Rep. of Germany ........... 235/156

OTHER PUBLICATIONS

Foster, "Battery Powered Data Entry Unit"—IBM Technical Disclosure Bulletin, vol. 15, No. 11, Apr., 1973, pp. 3437-3438.

Primary Examiner—Errol A. Krass
Attorney, Agent, or Firm—Albert F. Duke

[57] ABSTRACT

A portable calculator which includes circuitry for disabling operation of the display until a predetermined sequence of digits are entered from the keyboard. The circuitry includes a plurality of latches which are set in sequence in response to application of power to the calculator. The setting of the final latch disables the display so that although the computer chip is operative and responds to entries from the keyboard, no digits are displayed. Decoder circuitry responsive to the segment outputs of the computer chip permits the plurality of latches to be sequentially reset from the computer chip when the predetermined sequence of digits are entered from the keyboard or the computer chip is commanded to perform a mathematical calculation the result of which corresponds to the predetermined sequence of digits.

8 Claims, 1 Drawing Figure

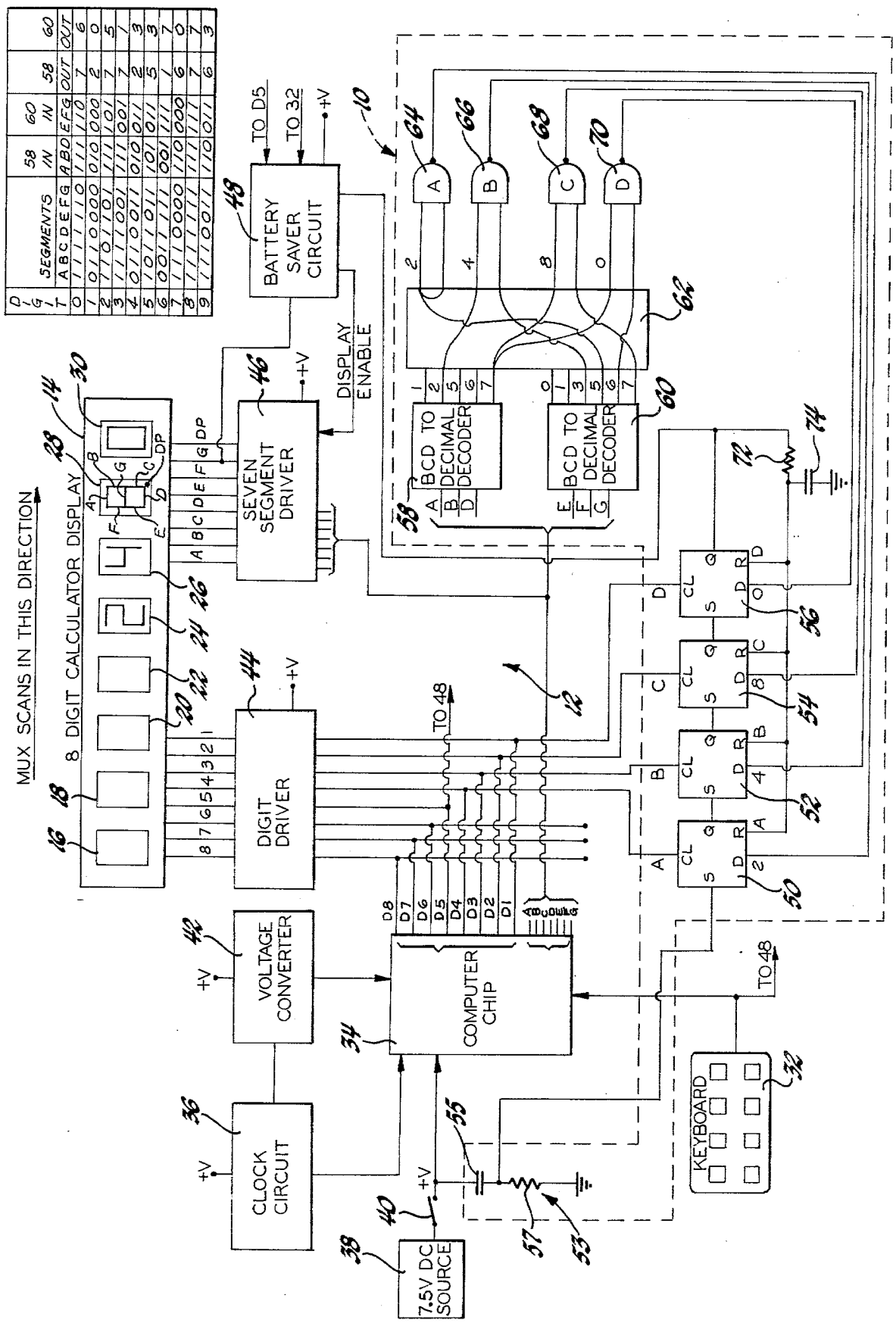

PORTABLE CALCULATOR INCORPORATING AN ANTI-THEFT FEATURE

This invention relates to portable calculators and more particularly, to a hand held calculator incorporating anti-theft circuitry which disables the calculator display upon application of power to the calculator until such time as a predetermined sequence of digits is presented to the calculator display either by entry from the keyboard or through performance of mathematical calculations by the calculator.

The emerging MOS/LSI technology has permitted introduction of a hand held calculator into the consumer market. The ease with which these calculators can be transported from one location to another has led to an increase in the theft of these devices.

It is an object of the present invention to deter theft of portable calculators without detracting from the portability of the device.

It is another object of the present invention to prevent useful operation of the calculator until the predetermined sequence of digits or code word has been entered by the operator or generated by the calculator during the performance of a mathematical computation.

These and other objects of the present invention are accomplished in accordance with a preferred embodiment of the invention by the addition of electronic circuitry responsive to the digit outputs and segment outputs of the computer chip of a conventional calculator and to the On/Off switch of the calculator. More particularly, when power is applied to the computer chip from the On/Off switch a plurality of latches are set in sequence and the setting of the final latch disables at least a portion of the display. The computer chip is, however, operative and responds to entries from the keyboard, storing digit entries and performing mathematical functions in accordance with commands from the keyboard. A decoder is responsive to the segment outputs of the computer chip and when a particular sequence of digits occurs the plurality of latches will be sequentially reset in response to the digit outputs of the computer chip and the outputs of the decoder so as to enable the display. The plurality of latches are held in a reset state until the On/Off switch is switched to the Off position.

A more complete understanding of the present invention may be had from the following detailed description which should be read in conjunction with the single drawing which discloses a block diagram of a preferred embodiment of the invention.

Referring now to the single drawing the components shown outside the dotted line designated 10 define a standard calculator generally designated 12 such as Model IC-2009, available from the Heath Company, Benton Harbor, Michigan. The calculator 12 includes a display generally designated 14 which comprises eight seven-segment LED (Light Emitting Diode) digit position displays designated 16–30. As shown in position display 28, each of the eight displays includes seven segments designated A, B, C, D, E, F, G and a decimal point DP. By supplying current to appropriate ones of the segments the digits 0–9 are formed. Each segment includes a number of junction diodes. All diodes of all segments in respective digit display have their cathodes connected to the respective inputs designated 1–8. The anodes of all diodes respective segments of all digit displays are connected to respective inputs designated A–G and DP. Each digit display 16–30 is enabled by grounding the input lines in the sequence 8, 7, 6, 5, 4, 3, 2, 1 and by applying a voltage to the desired segments A–G at the appropriate time so that the desired digit is displayed in the appropriate position.

The calculator 12 further includes a keyboard generally designated 32 for entering digits and for commanding mathematical operations such as Add, Subtract, Multiply and Divide. A computer chip generally designated 34 includes the digital control logic for performing the various mathematical computations and for controlling the display 14. The computer chip 34 receives timing signals from a clock circuit generally designated 36. Positive voltage is applied to the computer chip 34 from a 7.5 volt DC source 38 through a manual On/Off switch 40. Negative voltage, required at various points in the computer chip 34, is provided from a plus to minus voltage converter 42 driven from the clock circuit 36 and providing −6.4 volts DC. The computer chip 34 is a single MOS/LSI circuit which receives digit entries and operation entries from the keyboard 32 and includes digit outputs D1–D8 which provide the strobe signals to a digit driver 44 in order to sequentially enable the digit position displays 16–30. Segment data for each digit appears during the appropriate strobe at the outputs designated A, B, C, D, E, F, and G which are connected with a seven segment driver 46 which has its output connected with the seven segments of each of the digit displays 16–30. The drive 46 also applies the DP input to the displays 16–30. The keyboard 32 and display 14 are multiplexed in a conventional manner by the computer chip 34. For example, as the four digits 2480 are to be displayed on the display 14, the seven segment code for the digit 2 will appear at the outputs A–G just prior to a strobe signal appearing at the D4 output. The seven segment code is applied to the anodes of each of the displays 16–30, however, it will appear in the digit position display 24 since only the cathodes associated with the display 24 is enabled during the time the seven segment code of the digit 2 is applied to the display. Similarly, as the seven segment code for the digits 4, 8 and 0 appear at the outputs A–G, the digit position displays 26, 28, and 30 are enabled from the D3, D2, and D1 outputs of the computer chip 34. Also, as the digits are entered from the keyboard the digit 2 will first appear in digit position display 30 and be shifted to the left by one digit position as each new digit is entered.

A battery saver circuit generally designated 48 receives inputs from the computer chip 34 and keyboard 32 and automatically turns off the display 15 seconds after the last digit or operation enters from keyboard 34. After the 15 second time period has elapsed a positive voltage is applied to the G segment and each time D5 of the computer chip 34 is pulsed the G segment of the digit display 22 is lighted to indicate that the battery saver circuit is operable.

Normally, voltage is applied to the battery saver circuit 48 from the source 38 through the On/Off switch 40. In accordance with the present invention a plurality of D type flip-flops 50, 52, 54, and 56 are interposed between the switch 40 and the battery saver circuit 48. Flip-flops 50–56 are initialized by a power-up circuit 53 comprising capacitor 55 and resistor 57. When the On/Off switch 40 is closed a momentary pulse is applied to set the flip-flop 50. As the capacitor 55 charges the set input to the flip-flop 50 is removed. Setting of the flip-flop 50 causes the Q output to go high which sets the flip-flop 52 which in turn sets the flip-flop 54 which then sets the flip-flop 56 causing its $\overline{Q}$ output to go low. When the $\overline{Q}$ output of the flip-flop 56 is driven low voltage is removed from the battery saver circuit 48. With voltage removed from the circuit 48 the DISPLAY ENABLE input to the driver 46 is low and no voltage is applied from the driver 46 to the anodes of the digit position displays 16–30. The computer chip 34 is, however, supplied with voltage so that each pulse from D5 enables the G segment in digit position display 22.

A BCD-to-decimal decoder 58 is connected with the A, B, and D segments outputs of the chip 34 and a second BCD-to-decimal decoder 60 is connected with E, F, and G segment outputs of the chip 34. A code board 62 interconnects certain outputs of the decoders 58 and 60 with inputs to NAND gates 64 and 66, 68, and 70 so that both inputs to the NAND gate 64 will go high and its output will go low when the seven segment code for the digit 2 appears at the outputs A–G of the chip 34. Similarly, the outputs of the gates 66, 68, and 70 go low when the seven segment code for the digits 4, 8, and 0 appear at the outputs A–G of the chip 34. For example, the seven segment code for the digit 4 is 0110011. Accordingly, the A, B, and D inputs to the decoder 58 are 010 respectively which is the BCD equivalent of the digit which raises the 2 output of the decoder 58. Also, the E, F, and G inputs to the decoder 60 are 011 respectively which is the BCD equivalent of the digit 3 which raises the 3 output of the decoder 60. The code board 62 routes the 2 and 3 outputs of the decoders 58 and 60 to the inputs of the NAND gates 66 so that when the seven segment code of the digit 4 appears on the chip 34 the output of an AND gate 66 goes low. As an alternative to the code board 62 and associated jumper wires, a diode matrix could be employed to accomplish the same purpose. The complete code table for the seven segment code corresponding to the digits 0–9 and the resulting input to the decoders 58 and 60 as well as their output is shown in the upper right hand corner of the drawing. The outputs of the gates 64–70 are connected with the D input to the flip-flops 50–56 respectively. The clock inputs of the flip-flops 50–56 are connected respectively with the D4, D3, D2, and D1 outputs of the chip 34. A clock signal is thus applied to the flip-flops 50–56 in sequence as the D4, D3, D2, and D1 outputs are pulsed. However, the set and reset inputs to the flip-flops 50–56 override the clock input so that if a set or reset input is high the flip-flop cannot change states. Thus, in order to switch the $\overline{Q}$ output of the flip-flop 56 high the set input of the flip-flops 56 must be released by the flip-flop 54. Similarly, the set input of the flip-flop 54 must be released by the flip-flop 52 and the set input to the flip-flop 52 must be released by the flip-flop 50. Thus, it is necessary for the output of the gate 64 to be low at the time D4 is pulsed in order to change the state of any of the flip-flops 52, 54, or 56. Similarly, the output of the gate 66 must be low at the time D3 is pulsed in order for the flip-flops 54 and 56 to change states. Accordingly, it will be understood that the outputs of the gates must be driven low in sequence and in correspondence with the pulsing of the outputs D4–D1 respectively. The outputs of the gates 64–70 will be driven low in sequence and in correspondence with the pulsing of the outputs D4–D1 if these digits are entered in the proper sequence from the keyboard 32. This sequence will also occur if the mathematical operation of multiplying the number 1240×2 is entered from the keyboard, or any other mathematical function equaling the code word of 2480.

The "unlocking" of the calculator by entry of the code number from the keyboard 32 occurs as follows. After closure of the switch 40 entry of the digit 2 raises the 5 output of the decoder 60 which is tied to both inputs of the gate 64 lowering the D input of the flip-flop 50. This occurs after the D5 pulse and just before the D4 pulse. The D4 pulse then clocks the flip-flop 50 lowering its Q output and releasing the set input to the flip-flop 52. Entry of the digit 4 causes the 7 segment code for the digit 4 to drive the 2 output of the decoder 58 and the 3 output of the decoder 60 high and the D input to the flip-flop 52 low just prior to the D3 pulse. The D3 pulse then clocks the flip-flop 52 releasing the set input to the flip-flop 54. Entry of the digit 8 drives the 7 output of the decoders 58 and 69 causing the D input to the flip-flop 54 to go low just prior to the D2 pulse. The D2 pulse lowers the Q output of the flip-flop 54 releasing the set input to the flip-flop 56. When the 0 digit is entered the 7 output of the decoder 58 is raised and the 6 output of the decoder 60 is raised so that the D input to the flip-flop 56 is lowered just prior to the D1 pulse. The D1 pulse drives the $\overline{Q}$ output of the flip-flop 56 high which applies voltage to the circuit 48 and enables the display so that the digits 2480 appear. When the $\overline{Q}$ goes high a holding circuit comprising a resistor 72 and capacitor 74 holds the flip-flops 50–56 in a reset state as long as the positive voltage source is connected with the calculator. When the switch 40 is open, the capacitor 74 discharges to release a reset input to the flip-flops 50–56 so that upon a subsequent closure of the switch 40 the flip-flops 50–56 will be initialized to a DISPLAY ENABLE condition.

The code word may be readily changed by modifying the input/output connections on the code board 62. The position of the code word 2480 may also be modified so as to introduce insignificant digits within the code word. For example, by connecting the clock input of flip-flop 50 with the D5 output rather than the D4 output of the computer chip 34, code number 2×480 will "unlock" the calculator where × may be any digit entered by the operator.

Having thus described my invention what I claim is:
1. A hand held calculator comprising:
   display means;
   a keyboard for entering the digits 0–9 and for commanding performance of the mathematical operations of addition, subtraction, multiplication, and division;
   digital computation means responsive to digit entries and operation entries from said keyboard for providing digit outputs and segment outputs for controlling said display means to display the digits entered or the result of said mathematical operations;
   switch means having a display enable state and a display disable state and responsive to application of power to said computation means for establishing said display disable state for disabling at least a portion of said display means;
   means including said switch means responsive to the output of said computation means for establishing said display enable state in response to entries from said keyboard producing a predetermined coded output from said computation means;
   and means responsive to said display enable state for maintaining said switch means in said display en- able state until power is removed from said computation means.

2. A hand held calculator comprising:

display means including a plurality of digits position displays, each display including a plurality of segment terminals and a control terminal;

a keyboard for entering the digits 0–9;

control means responsive to each digit entry from said keyboard and to the position of said entry relative to the position of previous and subsequent entries and providing digit position outputs for enabling respective ones of said control terminals of said display means in sequence and for providing segment outputs for enabling the appropriate segment terminals of said display means to display any digit entered from said keyboard in its proper position;

a plurality of bistable elements interconnected so that each succeeding element is set in response to the setting of the previous element and no succeeding element can be reset until the previous element is reset;

means responsive to application of power to said control means for momentarily setting the first of said elements;

means responsive to the setting of the last of said elements for disabling at least a portion of said display means;

decoder means responsive to said segment outputs for identifying the digit entries from said keyboard;

means including said bistable element responsive to the output of said decoder means and to said certain ones of said digit outputs of said control means for resetting said elements in sequence when a predetermined number of digits are entered in a predetermined sequence;

means responsive to the resetting of the last of said elements for maintaining said plurality of elements in a reset state until power is removed from said control means.

3. A hand held calculator comprising:

an On/Off switch;

display means including a plurality of seven segment position displays, each position display including a plurality of anode terminals and a cathode terminal;

a keyboard for entering the digits 0–9;

digital control means for enabling respective ones of said cathode terminals in timed sequence from the most significant digit position to the least significant digit position of said display means, said digital control means responsive to inputs from said keyboard for providing corresponding seven segment outputs to said display means synchronized with enablement of the corresponding cathode terminals depending on the relative positions of a digit entry;

a plurality of D type flip-flops each succeeding flip-flop having its set input connected with the Q output of the previous flip-flop;

means responsive to the state of the last of said plurality of flip-flops for disabling at least a portion of said display means when said last flip-flop is set and for enabling said display means when said last flip-flop is reset;

initialization means responsive to the placing of said On/Off switch in an On position for setting the first of said plurality of flip-flops;

means interconnecting the block input of each of said flip-flops with respective ones of said digit outputs;

first and second binary coded decimal-to-decimal decoder means, each connected with certain ones of said segment outputs, a plurality of AND function performing logic gates corresponding in number to said plurality of flip-flops, each gate means having its output connected with the D input of respective ones of said plurality of flip-flops;

coding means interconnecting the inputs of said gate means with certain outputs of said decoder means whereby each of said gate means is sequentially enabled and each of said flip-flops is sequentially reset in response to entry of a predetermined number of bits in a predetermined sequence;

circuit means responsive to the resetting of the last of said flip-flops for maintaining each of said flip-flops in a reset state until said On/Off switch is moved to its Off position.

4. A method for allowing only authorized use of an electronic calculator having a data entry keyboard, comprising the steps of:

rendering the calculator initially inoperative after turn on; and entering a predetermined data sequence into the calculator by means of the data entry keyboard for rendering the calculator operative.

5. The method recited in claim 4 wherein the calculator includes a visual display device, and the step of rendering the calculator inoperative includes the step of rendering the visual display device inoperative.

6. In an electronic calculator having a data entry keyboard, a data display, a data display memory and means for electrically energizing and deenergizing said calculator, the improvement comprising:

means for selectively enabling and disabling the operation of said calculator, said selective enabling and disabling means being operative to render a portion of said calculator inoperative when said calculator is initially energized by said energizing means; and means responsive to data stored in said display memory for rendering said inoperative portion of said calculator operative in response to the entry of a predetermined data sequence into said data display.

7. The improvement recited in claim 6 wherein said data display memory includes a plurality of outputs for providing binary data bits in parallel for defining display characters, a sequence of characters being defined by a corresponding sequence of data bits from said outputs, said data responsive means being responsive to said data bits for rendering said portion of said calculator operative upon the receipt of a predetermined sequence of data bits representative of a predetermined sequence of characters from said outputs.

8. The improvement as recited in claim 6 wherein said portion includes said data display.

* * * * *